(12) United States Patent
Liu

(10) Patent No.: US 11,596,173 B2
(45) Date of Patent: Mar. 7, 2023

(54) ELECTRONIC CIGARETTE

(71) Applicant: Tuanfang Liu, Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 503 days.

(21) Appl. No.: 16/718,232

(22) Filed: Dec. 18, 2019

(65) Prior Publication Data

US 2021/0084974 A1    Mar. 25, 2021

(30) Foreign Application Priority Data

Sep. 24, 2019  (CN) .......................... 201910902917.3
Sep. 24, 2019  (CN) .......................... 201921602714.4
Oct. 12, 2019  (CN) .......................... 201921711340.X

(51) Int. Cl.
| | |
|---|---|
| *A24F 40/44* | (2020.01) |
| *A24F 40/46* | (2020.01) |
| *A24F 7/02* | (2006.01) |
| *F16J 15/10* | (2006.01) |

(52) U.S. Cl.
CPC ............... *A24F 40/44* (2020.01); *A24F 7/02* (2013.01); *A24F 40/46* (2020.01); *F16J 15/104* (2013.01)

(58) Field of Classification Search
CPC . A24F 40/02; A24F 40/44; A24F 40/46; F16J 15/104
See application file for complete search history.

(56) References Cited

U.S. PATENT DOCUMENTS

| | | | |
|---|---|---|---|
| 2013/0087160 A1* | 4/2013 | Gherghe ................. | A24F 47/00 131/329 |
| 2016/0015081 A1* | 1/2016 | Liu ........................ | A24F 47/008 |
| 2017/0042228 A1* | 2/2017 | Liu ........................ | A24F 47/008 |
| 2019/0269173 A1* | 9/2019 | Chung .................. | A24F 47/002 |

* cited by examiner

*Primary Examiner* — Michael J Felton
*Assistant Examiner* — Ronnie Kirby Jordan
(74) *Attorney, Agent, or Firm* — Matthias Scholl P.C.; Matthias Scholl

(57) ABSTRACT

An electronic cigarette, including: a mouthpiece; a first seal ring; a glass tube; a hollow rod; a permanent seat; a first piece of cotton; a ceramic atomization core; a second piece of cotton; an annular sleeve; two second seal rings; a base seat; an insulation ring; and a joint comprising an anode and cathode. The mouthpiece is disposed on the glass tube. The first seal ring is disposed in the mouthpiece to seal a gap between the mouthpiece and the glass tube. The hollow rod is disposed in the glass tube, and the two second seal rings are disposed on one end of the hollow rod away from the first seal ring to seal a gap between the glass tube and the hollow rod. The first piece of cotton and the second piece of cotton are disposed on two ends of the ceramic atomization core, respectively.

2 Claims, 8 Drawing Sheets

ELECTRONIC CIGARETTE

CROSS-REFERENCE TO RELATED APPLICATIONS

Pursuant to 35 U.S.C. § 119 and the Paris Convention Treaty, this application claims foreign priority to Chinese Patent Application No. 201910902917.3 filed Sep. 24, 2019, to Chinese Patent Application No. 201921602714.4 filed Sep. 24, 2019, and to Chinese Patent Application No. 201921711340.X filed Oct. 12, 2019. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to an electronic cigarette.

Electronic cigarettes atomize nicotine-containing e-liquid.

SUMMARY

The disclosure provides an electronic cigarette.

An electronic cigarette, comprises: a mouthpiece; a first seal ring; a glass tube; a hollow rod; a permanent seat; a first piece of cotton; a ceramic atomization core; a second piece of cotton; an annular sleeve; two second seal rings; a base seat; an insulation ring; and a joint comprising an anode and cathode; wherein: the mouthpiece is disposed on the glass tube; the first seal ring is disposed in the mouthpiece to seal a gap between the mouthpiece and the glass tube; the hollow rod is disposed in the glass tube, and the two second seal rings are disposed on one end of the hollow rod away from the first seal ring to seal a gap between the glass tube and the hollow rod; the first piece of cotton and the second piece of cotton are disposed on two ends of the ceramic atomization core, respectively; the ceramic atomization core is fixed on the permanent seat; the permanent seat is disposed in the hollow rod; the insulation ring is disposed in the base seat; the joint is disposed in the insulation ring; the base seat, the insulation ring, and the joint are disposed in the one end of the hollow rod away from the mouthpiece; the annular sleeve sleeves the one end of the hollow rod away from the mouthpiece; the glass tube is fixed on the hollow rod, and two ends thereof are sealed by the first seal ring and the two second seal rings, respectively; and the mouthpiece is in threaded connection to the hollow rod.

An electronic cigarette, comprises: a mouthpiece; a first seal ring; a glass tube; a hollow rod; a permanent seat comprising a first mounting base and a second mounting base; a first piece of cotton; a first ceramic atomization core; a second ceramic atomization core; a second piece of cotton; an annular sleeve; two second seal rings; a base seat; an insulation ring; and a joint comprising an anode and cathode; wherein: the mouthpiece is disposed on the glass tube; the first seal ring is disposed in the mouthpiece to seal a gap between the mouthpiece and the glass tube; the hollow rod is disposed in the glass tube, and the two second seal rings are disposed on one end of the hollow rod away from the first seal ring to seal a gap between the glass tube and the hollow rod; the first piece of cotton is disposed on the first ceramic atomization core, and the second piece of cotton is disposed under the second ceramic atomization core; the first ceramic atomization core and the second ceramic atomization core are fixed on the first mounting base and the second mounting base of the permanent seat, respectively; the permanent seat is disposed in the hollow rod; the insulation ring is disposed in the base seat; the joint is disposed in the insulation ring; the base seat, the insulation ring, and the joint are disposed in the one end of the hollow rod away from the mouthpiece; the annular sleeve sleeves the one end of the hollow rod away from the mouthpiece; the glass tube is fixed on the hollow rod, and two ends thereof are sealed by the first seal ring and the two second seal rings, respectively; and the mouthpiece is in threaded connection to the hollow rod.

An electronic cigarette, comprises: a mouthpiece; a first seal ring; a silicone ring; a glass tube; an annular sleeve; a hollow rod; a permanent seat; a ceramic atomizer comprising two atomization cores; a base seat; a second seal ring; an insulation ring; and a joint comprising an anode and cathode; wherein: the mouthpiece is disposed on the glass tube; the silicone ring is disposed in the mouthpiece to seal a gap between the mouthpiece and the glass tube; the first seal ring and the second seal ring are disposed on two ends of the hollow rod, respectively; the ceramic atomizer is fixed in the permanent seat; the permanent seat is disposed in the hollow rod; the insulation ring is disposed on the base seat; the joint is disposed in the insulation ring; the base seat, the insulation ring, and the joint are disposed in one end of the hollow rod away from the mouthpiece; the annular sleeve sleeves the one end of the hollow rod away from the mouthpiece; the glass tube is fixed on the hollow rod; and the mouthpiece is in threaded connection to the hollow rod; the first seal ring is adapted to seal a gap between the mouthpiece and the hollow rod; and the second seal ring is disposed on the one end of the hollow rod away from the mouthpiece to seal a gap between the hollow rod and the glass tube.

DETAILED DESCRIPTION

To further illustrate, embodiments detailing an electronic cigarette are described below. It should be noted that the following embodiments are intended to describe and not to limit the disclosure.

Figure 1:
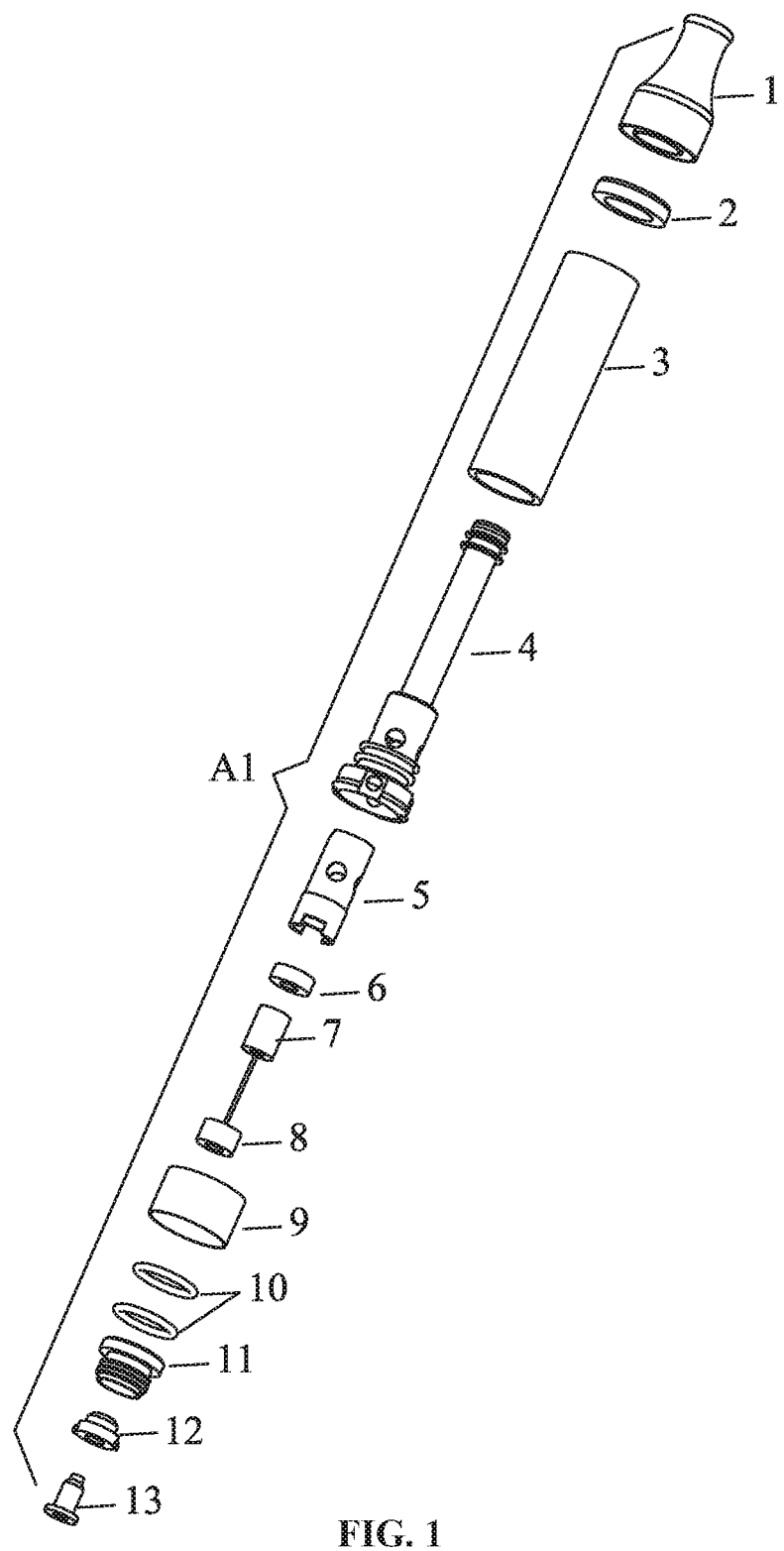
FIG. 1 is an exploded view of an electronic cigarette according to one embodiment of the disclosure.

As shown in FIG. 1, an electronic cigarette comprises a mouthpiece 1; a first seal ring 2; a glass tube 3; a hollow rod 4; a permanent seat 5; a first piece of cotton 6; a ceramic atomization core 7; a second piece of cotton 8; an annular sleeve 9; two second seal rings 10; a base seat 11; an insulation ring 12; and a joint 13 comprising an anode and cathode.

The mouthpiece 1 is disposed on the glass tube 3; the first seal ring 2 is disposed in the mouthpiece 1 to seal a gap between the mouthpiece 1 and the glass tube 3; the hollow rod 4 is disposed in the glass tube 3, and the two second seal rings 10 are disposed on one end of the hollow rod 4 away from the first seal ring to seal a gap between the glass tube 3 and the hollow rod 4; the first piece of cotton 6 and the second piece of cotton 8 are disposed on two ends of the ceramic atomization core 7, respectively; the ceramic atomization core 7 is fixed on the permanent seat 5; the permanent seat 5 is disposed in the hollow rod 4; the insulation ring 12 is disposed in the base seat 11; the joint 13 is disposed in the insulation ring 12; the base seat 11, the insulation ring 12, and the joint 13 are disposed in the one end of the hollow rod 4 away from the mouthpiece; the annular sleeve 9 sleeves the one end of the hollow rod 4 away from the mouthpiece; the glass tube 3 is fixed on the hollow rod 4, and two ends thereof are sealed by the first seal ring 2 and the two second seal rings 10, respectively; and the mouthpiece 1 is in threaded connection to the hollow rod 4.

In use, the air enters the hollow rod 4 via the air hole on the bottom of the hollow rod 4 and is discharged from the exit of the mouthpiece 1. Upon filling the e-liquid into the ceramic atomization core 7, bubbles may be produced. The bubbles can also be discharged from the exit of the mouthpiece 1, thus preventing the bubbles from blocking the ceramic atomization core 7. In addition, both ends of the ceramic atomization core 7 are provided with the first piece of cotton 6 and the second piece of cotton 8, respectively, which can adsorb the condensed e-liquid, thus improving the atomization efficiency.

Figure 2:
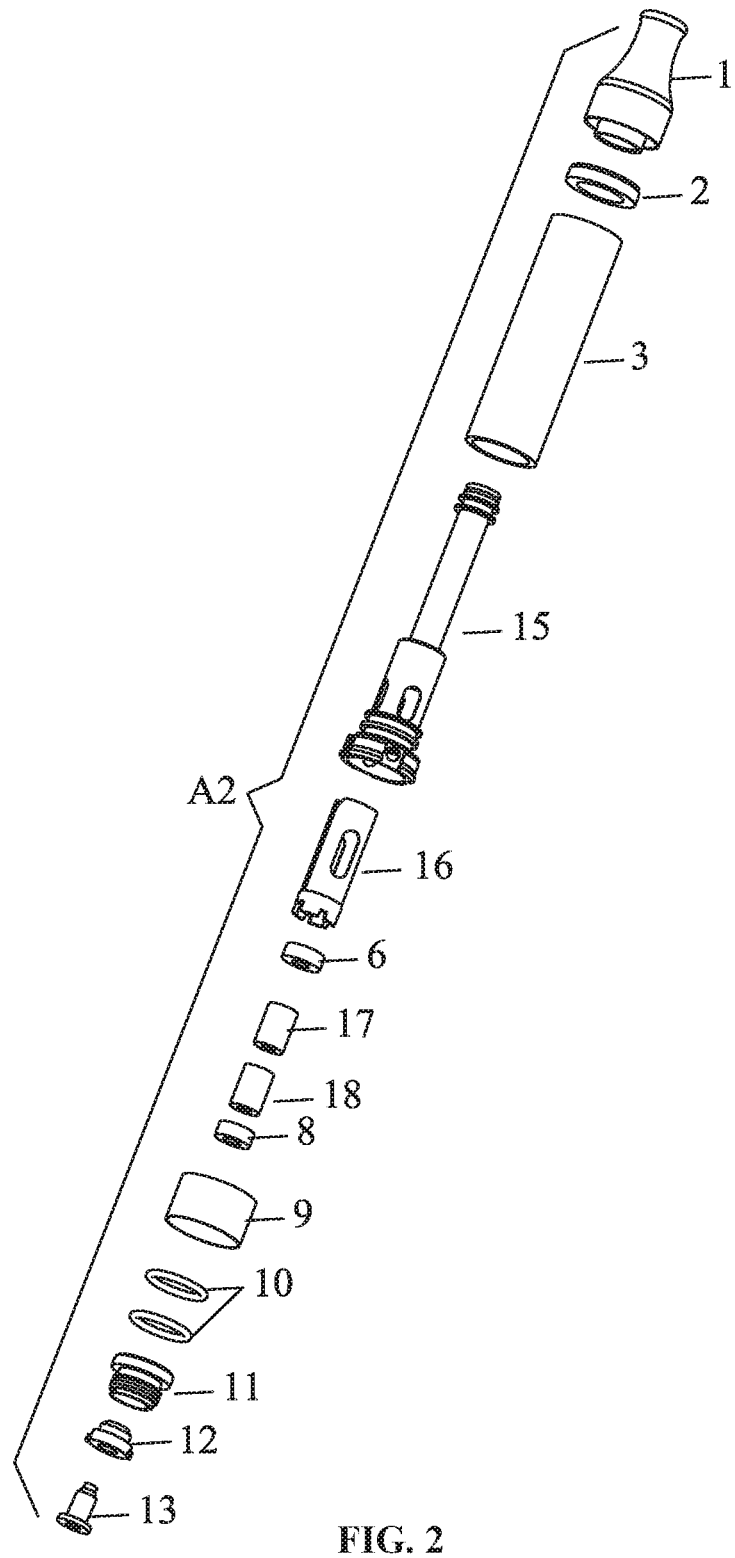
FIG. 2 is an exploded view of an electronic cigarette according to another embodiment of the disclosure.

As shown in FIG. 2, an electronic cigarette comprises a mouthpiece 1; a first seal ring 2; a glass tube 3; a hollow rod 15; a permanent seat 16 comprising a first mounting base and a second mounting base; a first piece of cotton 6; a first ceramic atomization core 17; a second ceramic atomization core 18; a second piece of cotton 8; an annular sleeve 9; two second seal rings 10; a base seat 11; an insulation ring 12; and a joint 13 comprising an anode and cathode.

The mouthpiece 1 is disposed on the glass tube 3; the first seal ring 2 is disposed in the mouthpiece 1 to seal a gap between the mouthpiece 1 and the glass tube 3; the hollow rod 15 is disposed in the glass tube 3, and the two second seal rings 10 are disposed on one end of the hollow rod 15 away from the first seal ring to seal a gap between the glass tube 3 and the hollow rod 15; the first piece of cotton 6 is disposed on the first ceramic atomization core 17, and the second piece of cotton 8 is disposed under the second ceramic atomization core 18; the first ceramic atomization core 17 and the second ceramic atomization core 18 are fixed on the first mounting base and the second mounting base of the permanent seat 16, respectively; the permanent seat 16 is disposed in the hollow rod 15; the insulation ring 12 is disposed in the base seat 11; the joint 13 is disposed in the insulation ring 12; the base seat 11, the insulation ring 12, and the joint 13 are disposed in the one end of the hollow rod 15 away from the mouthpiece; the annular sleeve 9 sleeves the one end of the hollow rod 15 away from the mouthpiece; the glass tube 3 is fixed on the hollow rod 15, and two ends thereof are sealed by the first seal ring 2 and the two second seal rings 10, respectively; and the mouthpiece 1 is in threaded connection to the hollow rod 15.

The electronic cigarette comprises two ceramic atomization cores and thus can produce much more vapor compared with conventional electronic cigarette, so it has better user experience.

Figure 3:
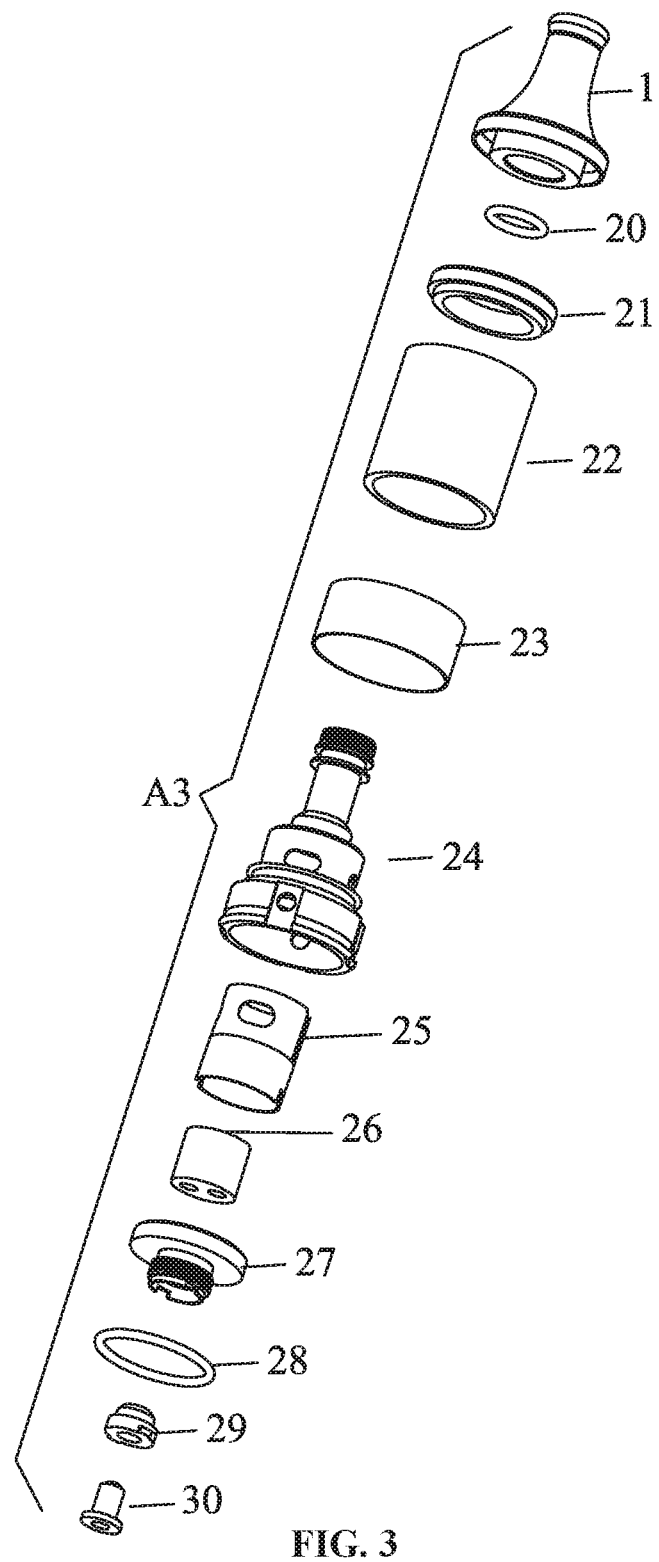
FIG. 3 is an exploded view of an electronic cigarette according to still another embodiment of the disclosure.
Figure 4:
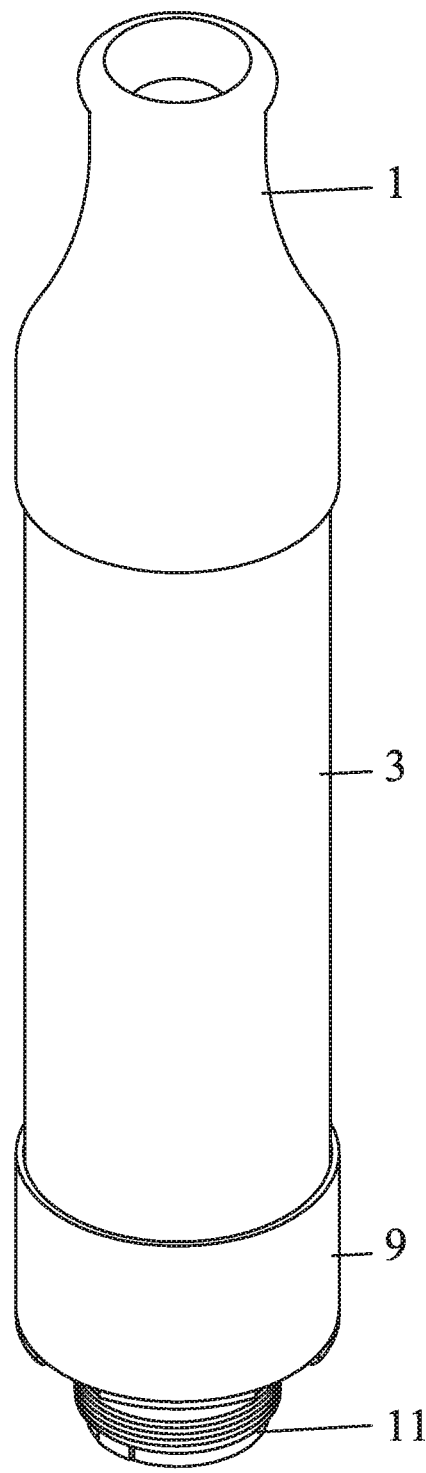
FIG. 4 is a stereogram of an electronic cigarette in FIGS. 1 and 2.
Figure 5:
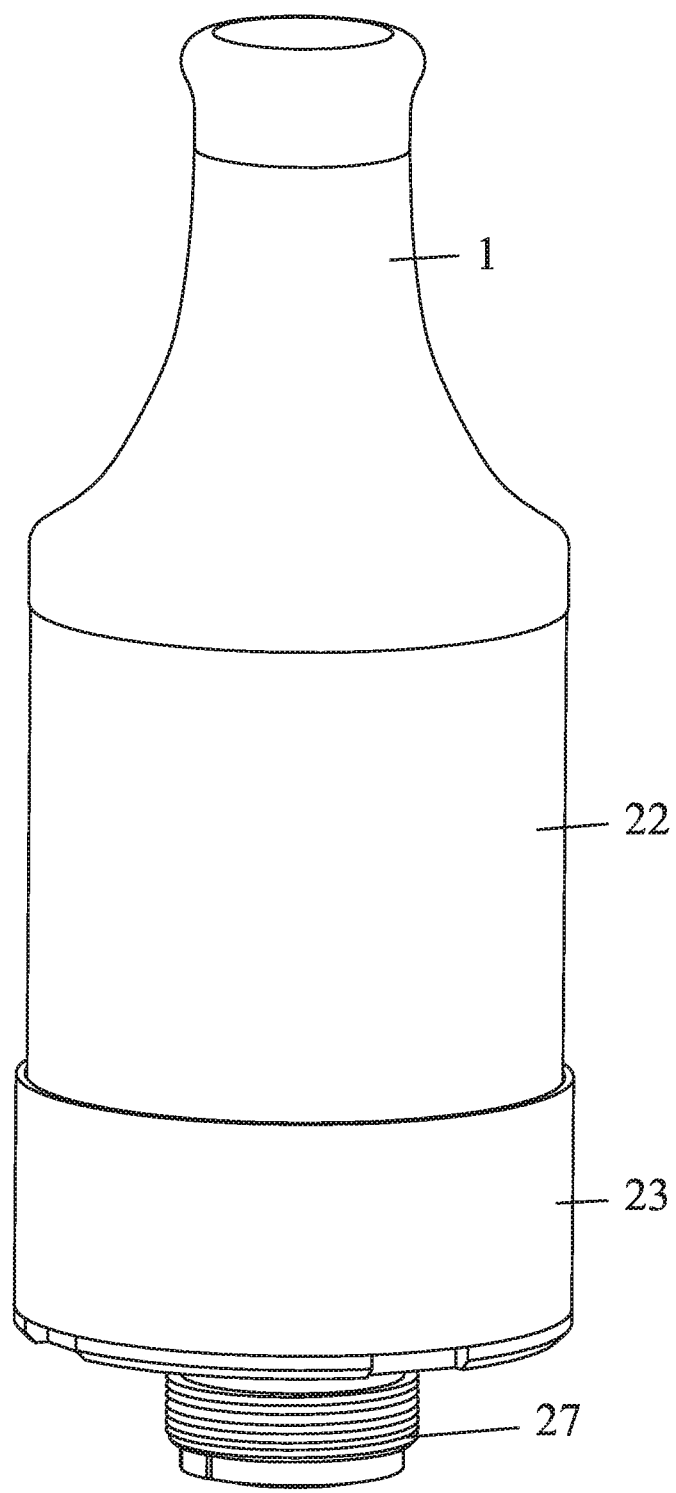
FIG. 5 is a stereogram of an electronic cigarette in FIG. 3.
Figure 6:
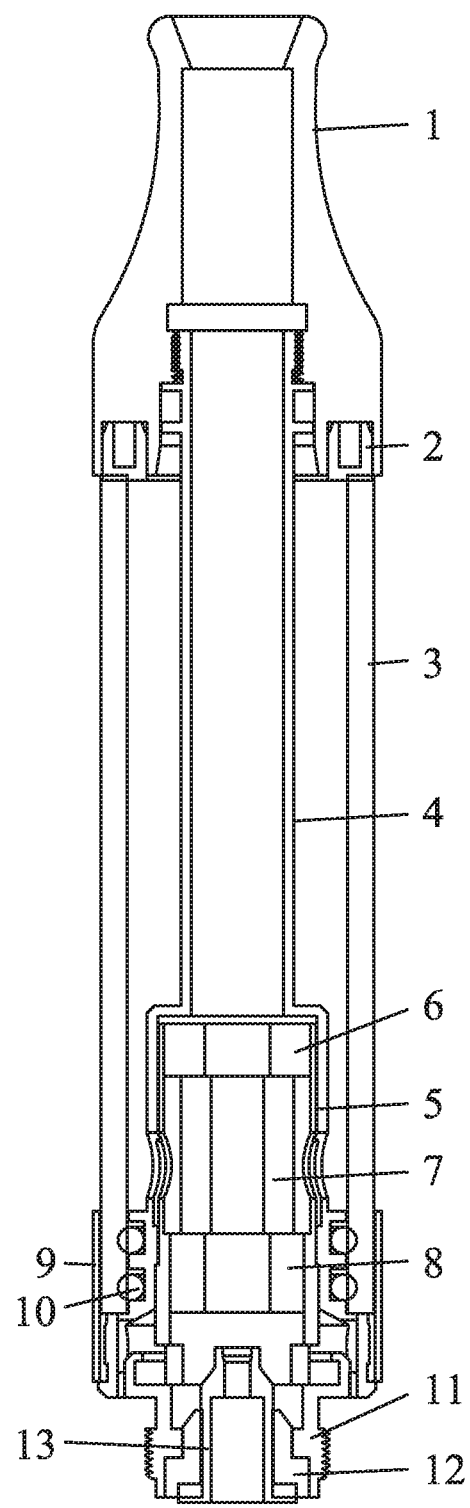
FIG. 6 is a sectional view of an electronic cigarette in FIG. 1.
Figure 7:
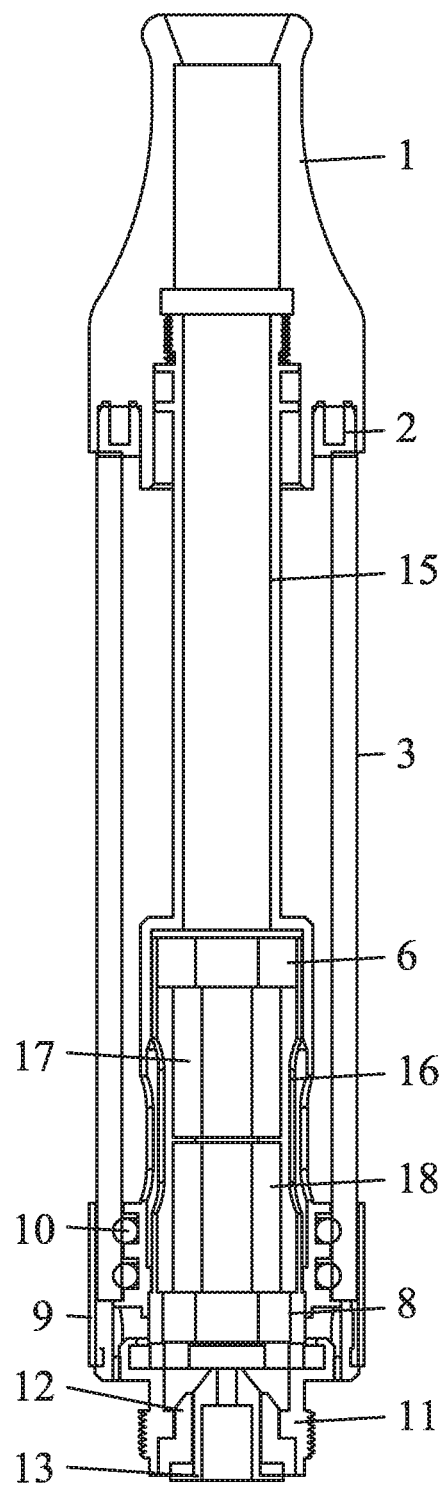
FIG. 7 is a sectional view of an electronic cigarette in FIG. 2.
Figure 8:
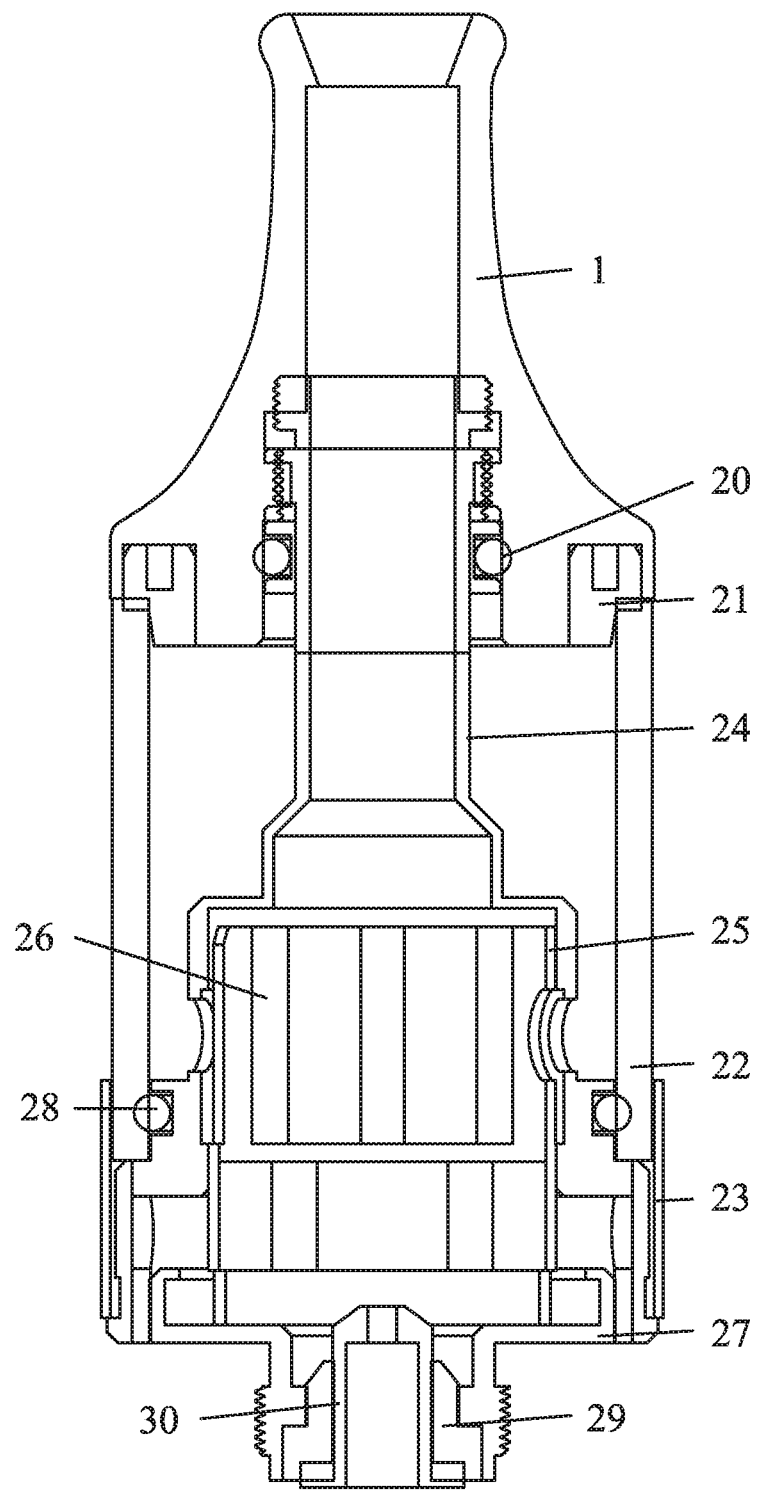
FIG. 8 is a sectional view of an electronic cigarette in FIG. 3.

As shown in FIG. 3, an electronic cigarette comprises a mouthpiece 1; a first seal ring 20; a silicone ring 21; a glass tube 22; an annular sleeve 23; a hollow rod 24; a permanent seat 25; a ceramic atomizer 26 comprising two atomization cores; a base seat 27; a second seal ring 28; an insulation ring 29; and a joint 30 comprising an anode and cathode.

The mouthpiece 1 is disposed on the glass tube 22; the silicone ring 21 is disposed in the mouthpiece 1 to seal a gap between the mouthpiece 1 and the glass tube 22; the first seal ring 20 and the second seal ring 28 are disposed on two ends of the hollow rod 24, respectively; the ceramic atomizer 26 is fixed in the permanent seat 25; the permanent seat 25 is disposed in the hollow rod 24; the insulation ring 29 is disposed on the base seat 27; the joint 30 is disposed in the insulation ring 29; the base seat 27, the insulation ring 29, and the joint 30 are disposed in one end of the hollow rod 24 away from the mouthpiece; the annular sleeve 23 sleeves the one end of the hollow rod 24 away from the mouthpiece; the glass tube 22 is fixed on the hollow rod 24; and the mouthpiece 1 is in threaded connection to the hollow rod 24; the first seal ring 20 is adapted to seal a gap between the mouthpiece 1 and the hollow rod 24; and the second seal ring 28 is disposed on the one end of the hollow rod 24 away from the mouthpiece to seal a gap between the hollow rod 24 and the glass tube 22.

The ceramic atomizer of the electronic cigarette comprises two ceramic atomization cores and thus can produce much more vapor compared with conventional electronic cigarette, so it has better user experience.

It will be obvious to those skilled in the art that changes and modifications may be made, and therefore, the aim in the appended claims is to cover all such changes and modifications.

What is claimed is:
1. A device, comprising:
1) A mouthpiece;
2) a first seal ring;
3) a glass tube for storing e-liquid;
4) a hollow rod comprising a top chamber, a middle chamber that is connected to the top chamber, a bottom chamber that is connected to the middle chamber, and a longitudinal axis defined by the top chamber, the middle chamber, and the bottom chamber;
5) a permanent seat;
6) a first piece of cotton comprising a first through hole;
7) a ceramic atomization core in a shape of a hollow cylinder comprising a top base and a bottom base and defining an air passage extending from the top base to the bottom base;
8) a second piece of cotton comprising a second through hole;
9) an annular sleeve;
10) two second seal rings;
11) a base seat;
12) an insulation ring; and
13) a joint comprising an anode and cathode; wherein:
the mouthpiece is disposed on the glass tube; the first seal ring is disposed in the mouthpiece to seal a gap between the mouthpiece and the glass tube;
the hollow rod is disposed in the glass tube, and the e-liquid is contained in a gap between the hollow rod and the glass tube; and the two second seal rings are disposed on one end of the hollow rod away from the first seal ring to seal the gap;

the ceramic atomization core is fixed on the permanent seat and is disposed in the middle chamber, the air passage extending in a direction along the longitudinal axis;

the first piece of cotton and the second piece of cotton abut against the top base and the bottom base, respectively;

the air passage is communicated with the top chamber through the first through hole and is communicated with the bottom chamber through the second through hole;

the insulation ring is disposed in the base seat; the joint is disposed in the insulation ring;

the base seat, the insulation ring, and the joint are disposed in the one end of the hollow rod away from the mouthpiece;

the annular sleeve sleeves the one end of the hollow rod away from the mouthpiece;

the glass tube is fixed on the hollow rod, and two ends thereof are sealed by the first seal ring and the two second seal rings, respectively;

the mouthpiece is in threaded connection to the hollow rod and is communicated with the top chamber;

an oil hole is disposed on a sidewall of the middle chamber such that the e-liquid from the glass tube is conveyed through the oil hole to the ceramic atomization core;

an air hole is disposed on a sidewall of the bottom chamber and communicates the bottom chamber with outside of the electronic cigarette; and when in use, fresh air from the outside of the electronic cigarette is conveyed through the bottom chamber to the air passage; the ceramic atomization core is heated such that the e-liquid within the ceramic atomization core is atomized into an atomized gas; then the atomized gas is discharged into the air passage, mixed with the fresh air in the air passage, and conveyed from the air passage through the top chamber to the mouthpiece.

2. The device of claim 1, wherein the ceramic atomization core further comprises a second air passage extending in a direction parallel with respect to the air passage.

\* \* \* \* \*